(12) United States Patent
Valentine et al.

(10) Patent No.: US 12,275,842 B2
(45) Date of Patent: Apr. 15, 2025

(54) FAST-HYDROLYZING POLYLACTIDE RESIN COMPOSITIONS

(71) Applicant: NatureWorks LLC, Minnetonka, MN (US)

(72) Inventors: James Russell Valentine, Chanhassen, MN (US); Joseph David Schroeder, Minneapolis, MN (US); Krag Ellis Anderson, Fridley, MN (US); Manuel A. W. Natal, Eden Prairie, MN (US); Oliver J. Palardy, Minneapolis, MN (US)

(73) Assignee: NatureWorks LLC, Plymouth, MN (US)

( * ) Notice: Subject to any disclaimer, the term of this patent is extended or adjusted under 35 U.S.C. 154(b) by 694 days.

(21) Appl. No.: 17/614,609

(22) PCT Filed: May 25, 2020

(86) PCT No.: PCT/US2020/034449
§ 371 (c)(1),
(2) Date: Nov. 29, 2021

(87) PCT Pub. No.: WO2020/251745
PCT Pub. Date: Dec. 17, 2020

(65) Prior Publication Data
US 2022/0235222 A1     Jul. 28, 2022

Related U.S. Application Data

(60) Provisional application No. 62/861,047, filed on Jun. 13, 2019.

(51) Int. Cl.
*C08L 67/04* (2006.01)
*C09K 8/508* (2006.01)

(52) U.S. Cl.
CPC ............ *C08L 67/04* (2013.01); *C09K 8/5086* (2013.01); *C08L 2205/02* (2013.01)

(58) Field of Classification Search
CPC ...................................................... C08L 67/04
See application file for complete search history.

(56) References Cited

U.S. PATENT DOCUMENTS

| 4,983,745 | A |  | 1/1991 | Manfred |
|---|---|---|---|---|
| 5,053,485 | A |  | 10/1991 | Nieuwenhuis |
| 5,338,822 | A |  | 8/1994 | Gruber |
| 5,424,346 | A |  | 6/1995 | Sinclair |
| 2009/0274742 | A1 | * | 11/2009 | Brown .................. A61L 31/041 424/602 |

(Continued)

FOREIGN PATENT DOCUMENTS

| WO | 90/01521 A | 2/1990 |
|---|---|---|
| WO | 94/08078 A | 4/1994 |
| WO | 2010/105143 A | 9/2010 |

(Continued)

*Primary Examiner* — Michael F Pepitone (57) ABSTRACT

Polylactide resin compositions that exhibit rapid hydrolysis rates and leave small amounts of residuals include a poly (meso-lactide) and a second polylactide. The polylactide resin compositions are useful in applications in which rapid hydrolysis is wanted under mildly to moderately elevated temperatures, such as in certain oil & gas well treatment applications.

6 Claims, 1 Drawing Sheet

(56) References Cited

U.S. PATENT DOCUMENTS

2014/0323365 A1\* 10/2014 Kamann ................ D01F 6/625
                                                                   525/450
2015/0083423 A1    3/2015  Brannon

FOREIGN PATENT DOCUMENTS

| WO | 2013/039266 A | 3/2013 |
| WO | 2013/090252 A | 6/2013 |

\* cited by examiner

FAST-HYDROLYZING POLYLACTIDE RESIN COMPOSITIONS

This invention relates to polylactide resin compositions that hydrolyze rapidly in aqueous media.

Polylactide resins are known to hydrolyze in the presence of water. Given enough time, a polylactide resin can eventually hydrolyze to form low-molecular-weight species which are soluble in water or which can be consumed by microbes. Polylactide resins are compostable due to their ability to hydrolyze in this way.

Some applications for polylactides seek to take advantage of this property. An example of such an application is as a degradable chemical diverter in an oil and/or gas production well. Diverters are used in injection treatments to ensure a uniform distribution of treatment fluid across the treatment interval. Injected fluids tend to follow the path of least resistance, possibly resulting in the least permeable regions receiving inadequate treatment. The diverter is injected into the formation with the treatment fluid. When emplaced, the diverter temporarily blocks off certain regions of the formation from the injection treatment, diverting the treatment to less permeable areas that otherwise might not become treated adequately. To be effective, the diversion effect must be temporary, so the full productivity of the well can be restored when the treatment is complete. Polylactide resins provide the needed temporary blocking effect because they hydrolyze under the conditions of moisture and temperature in the well, forming low-molecular-weight species that either dissolve or wash away, thereby reopening the blocked region of the formation when the well goes to production.

The problem is that the hydrolysis often proceeds more slowly than is wanted and the diverter remains in place too long. This problem is especially acute in lower temperature formations (such as 37° C. to 66° C.).

Polylactide hydrolysis rates are related to crystallinity. More highly crystalline polylactides tend to hydrolyze relatively slowly. Because of this, so-called "amorphous" polylactide grades have been preferred when faster hydrolysis rates are wanted. "Amorphous" polylactide grades are polylactide resins that can crystallize with difficulty if at all, and which, if crystallized at all, produce only small amounts of crystallites of lower melting point than for easily crystallized polylactide resins.

In general, the ability of a polylactide resin to crystallize is strongly dependent on its stereochemistry. Commercially available polylactide resins are almost always copolymers that contain randomly distributed L- (S) and D- (R) lactic acid units. Greater stereochemical purity correlates with greater ability to crystallize. So-called "amorphous" grades may contain, for example, 80% to as much as 92% of a predominant enantiomer (usually the L-lactic enantiomer in commercially available grades) and 8% to 20% of the other enantiomer. A specific example of a polylactide resin used in diverter applications is a random copolymer of L-lactide, meso-lactide, and optionally D-lactide, which contains 12% D-lactic units.

Even some commercial amorphous grades have been found to hydrolyze too slowly under some well conditions.

Polylactide diverters also should have other important properties. These diverters are in the form of mixtures of particulates, i.e., small pellets, powders, fibers, and/or flake, in different weight ratios and, in some cases, densities. The particulates should be resistant to agglomeration or "blocking" under dry conditions (i.e., in the absence of moisture or liquid water), so they can be transported and stored without requiring climate-controlled containers to mitigate the formation of an agglomerated mass. Because the diverters are often stored on-site under ambient conditions, the polylactide diverters should be resistant to blocking when stored at temperatures of as much as 45° C. or even 50° C., as are sometimes encountered in the summer in hot climates in such oil & gas producing basins as the Permian in West Texas. Unfortunately, highly amorphous polylactide resins which tend to hydrolyze more rapidly also tend to block readily. Therefore, modifications to a polylactide resin that favor faster hydrolysis and mass loss also tend to promote blocking.

In addition, the manner in which the polylactide diverter behaves during transfer downhole is important. The diverter should not hydrolyze too quickly to form a large, cohesive, sticky mass as the diverter is being transferred to the fractures where diversion is desired. Transfer of any sticky hydrolysis residuals back to the surface when the well goes to production can lead to fouling of surface production equipment. In a preferred system, the diverter particles do not agglomerate or only form a mass of lightly agglomerated particles that can be easily broken up mechanically at the surface when they are mixed with water and pumped downhole.

Yet another important property is the extent of mass loss that the diverter particles experience. It is known that the amorphous phase in PLA hydrolyzes much faster than the crystalline phase. It is also known that even amorphous PLA grades generate some level of crystallinity during hydrolysis, particularly if the hydrolysis is conducted at temperatures below 110° C. Under those temperature conditions the hydrolysis of amorphous phase and solubilization of the oligomeric products leaves behind a crystalline phase, at which point an apparent plateau is reached where further mass loss becomes very slow. Once this plateau is reached, the remaining mass (sometimes referred to as "residuals") should be as small as possible, preferably no more than 25% of the original diverter mass. In addition to hydrolyzing too slowly for some applications, polylactide resins that have been used in diverter applications tend to have "residuals" that are higher than desired, i.e., the rate of mass loss becomes very slow when as much as 50-60% of the original mass of the diverter remains. Residuals tend to be noticed more often when hydrolysis is conducted at low temperatures (≤66° C.), rather than at high temperatures.

A polylactide resin composition that hydrolyzes rapidly is desired, particularly at temperatures of 37° C. to 66° C., and produces small amounts of residuals. It would be more desirable if such a composition was resistant to blocking under dry conditions, particularly at moderately elevated temperatures such as 40° C. to 50° C. The composition preferably resists blocking when wet at similar temperatures.

This invention is a polylactide resin composition, comprising a melt- or solution-blend of
  a) 50 to 95 weight percent, based on the weight of all polylactides in the composition, of at least one polymer or copolymer of meso-lactide having a number-average molecular weight as measured by gel permeation chromatography (GPC) against a polystyrene standard of at least 5000 g/mol, wherein the polymer or copolymer of meso-lactide contains at least 90% by weight lactic units, at least 80% of the lactic units are formed by polymerizing meso-lactide, and has an average length of blocks of L-lactic units and of D-lactic units equal to at least 1.1 and up to 2.0;
  b) 5 to 50 weight percent, based on the weight of all polylactides in the composition, of at least one polylactide having a number-average molecular weight as measured by GPC against a polystyrene standard of at least 5000 g/mol and at least 90% by weight lactic units, wherein the lactic units contain L-lactic units and D-lactic units in a ratio of ≥65:35 or ≤35:65.

For convenience, the foregoing polymer or copolymer of meso-lactide is referred to herein as "poly(meso-lactide)" or "PMLA" and the foregoing polylactide described in paragraph b) above is referred to as "polylactide (b)".

The polylactide resin composition of the invention offers several surprising yet important advantages. It exhibits a fast rate of hydrolysis compared with commercially available polylactide resin grades, even at moderate temperatures such as 37° C. to 66° C. This fast rate of hydrolysis is of great advantage in industrial composting and in certain end-use applications, such as when the composition is used as a diverter in an oil and/or gas production well. This fast hydrolysis rate continues until a large proportion of the original mass of the composition has been lost, leading to low "residuals".

Furthermore, the rate of hydrolysis is "tunable" across a broad range by varying the ratios of the PMLA and polylactide (b), and further by including or excluding various additives (and by varying their amounts when present) as described more fully below.

The polylactide resin composition of the invention resists blocking under dry conditions up to moderately elevated temperatures such as 40° C. to 50° C.

Furthermore, a mass of particles of the polylactide resin composition tends to hydrolyze (and lose mass by virtue of such hydrolysis) in a particularly beneficial way, particularly when hydrolyzed at low or moderate temperatures (such as below 100° C.). As hydrolysis proceeds, the particles tend to retain their particulate nature without blocking or agglomerating into a sticky mass. As described below, such a mass of particles may form light agglomerates during an intermediate stage of hydrolysis, but the particles largely retain their particulate identity throughout. As more mass is lost, the remaining portion of the particles tends to develop a significant amount of crystallinity and at that point once again become discreet and non-agglomerated or very nearly so. The molecular weight of such crystalline residuals generally is quite low, typically being less than 5000 g/mole (as measured by GPC against polystyrene standards), and hence they have little mechanical strength and are friable. In a diverter application, this allows the residuals to be removed from the formation easily with no impact on retained permeability and with reduced equipment fouling at the well surface. The development of significant crystallinity itself is surprising, because PMLA is generally not amenable to crystallization and the polylactide (b) may be a grade that by itself crystallizes only to a small extent, if at all.

Because of these characteristics, the polylactide composition of the invention is particularly well adapted for use as a diverter in a subterranean formation. Thus, in another aspect, the invention is a method for treating a subterranean formation comprising
  a) introducing a treatment fluid which contains a liquid phase and particles of the polylactide composition of the first aspect into the subterranean formation, such that a mass of the particles is deposited in the subterranean formation, and then
  b) hydrolyzing the deposited particles in the subterranean formation by exposing the deposited particles to an aqueous medium and an elevated temperature such that the deposited particles lose at least 50% of their starting mass due to hydrolysis.

PMLA

Lactic acid is a molecule with one chiral center, so it exists in two enantiomeric forms: the so-called D- (or R-) enantiomer and the L- (or S-) enantiomer. Two molecules of lactic acid can condense with the elimination of two molecules of water to form a 3,6-dimethyl-1,4-dioxane-2,5-dione, which is referred to herein as "lactide". Lactide can be considered as being made up of two "lactic units", each of which has the structure:

Each lactic unit in a lactide molecule contains one chiral center and exists in either the D- or the L-form. A lactide molecule can take one of three forms: 3S,6S-3,6-dimethyl-1,4-dioxane-2,5-dione (L-lactide), 3R,6R-3,6-dimethyl-1,4-dioxane-2,5-dione (D-lactide), and 3R,6S-dimethyl-1,4-dioxane-2,5-dione (meso-lactide). These have the following structures:

L-lactide and D-lactide are a pair of enantiomers, while meso-lactide is a stereoisomer having one L-lactic unit and one D-lactic unit. In addition, a mixture of about 50% L-lactide and 50% D-lactide forms a high-melting material known as racemic-lactide (or "rac-lactide"). Hydrolysis of meso-lactide and rac-lactide will both yield a mixture of 50% L-lactic acid and 50% D-lactic acid.

Meso-lactide is unique among these various forms of lactide because, as it homopolymerizes, the number of consecutive L-lactic units and D-lactic units produced in the polymer is at a minimum 1 or a maximum 2. Polymerization of mixtures of L-lactide and D-lactide will incorporate segments of even-numbered lactic acid units in the polymer, the average block length of which will be determined by the ratio of monomers present in the feedstock. A molecule of meso-lactide, when adding onto the end of a growing polymer chain during the polymerization process, introduces a single L-lactic unit and a single D-lactic unit to the chain end. If the meso-lactide polymerizes in a "head-to-tail" manner (i.e., a D-lactic unit adds to a terminal L-lactic unit on the polymer chain or vice versa), a stereoregular polymer having the form:

is produced, where D designates a D-lactic unit and L denotes an L-lactic unit. A PMLA having this configuration is sometimes referred to as "syndiotactic". In this configuration, the number of consecutive D- and L-lactic units is always 1.

Conversely, if the meso-lactide polymerizes in "head to head" manner (i.e., if a D-lactic unit adds to a terminal L-lactic unit), a polymer having the form:

(D-L-L-D)$_n$ is instead produced. A PMLA having this structure is sometimes referred to as "heterotactic". In this case, the number of consecutive D- and L-lactic units is always 2. When the meso-lactide polymerizes randomly, the number of consecutive D- and L-lactic units is sometimes 1 and sometimes 2, with an average between 1 and 2.

The PMLA of this invention is a homopolymer of meso-lactide or a copolymer of at least 80% meso-lactide and up to 20% of another lactide, preferably at least 88% meso-lactide and up to 12% of another lactide or at least 90% meso-lactide and up to 10% of another lactide. If a copolymer, then the copolymer may be a random and/or block copolymer. The other lactide may be any other lactide, including L-lactide, D-lactide, or rac-lactide, or a mixture of any two or more thereof.

At least 90% or at least 95% of the weight of the PMLA is made up of lactic units. 40% to 60% of the lactic units are L-lactic units, and correspondingly 60% to 40% of the lactic units are D-lactic units.

The PMLA may further contain repeating units formed from other monomers that are copolymerizable with lactide, such as alkylene oxides (including ethylene oxide, propylene oxide, butylene oxide, tetramethylene oxide, and the like), cyclic lactones, or carbonates. Repeating units derived from these other monomers can be present in block and/or random arrangements. These other repeating units suitably constitute up to 10% by weight of the polylactide, preferably from 0% to 5% by weight, especially from about 0% to 2% by weight, of the polylactide, and may be absent.

The PMLA may also contain residues of an initiator compound, which is often used during the polymerization process to provide molecular weight control. Suitable such initiators include, for example, water, alcohols, polyhydroxy compounds of various types (such as ethylene glycol, propylene glycol, polyethylene glycol, polypropylene glycol, other glycol ethers, glycerin, trimethylolpropane, pentaerythritol, hydroxyl-terminated butadiene polymers, and the like), polycarboxyl-containing compounds, and compounds having at least one carboxyl and one hydroxyl group (such a lactic acid or lactic acid oligomer). The initiator residue preferably constitutes no more than 5%, and especially no more than 2% of the weight of the PMLA, except in the case in which the initiator is a residue of a lactic acid or lactic acid oligomer, which can constitute any proportion of the PMLA.

The PMLA may have long-chain branches (having 3 or more carbon atoms). Long-chain branches can be introduced in the polylactide in various ways, such as by reacting carboxyl groups on the polylactide with epoxide groups that are present on an acrylate polymer or copolymer. The acrylate polymer or copolymer is characterized in being a solid at 23° C., containing an average of from about 2 to about 15 free epoxide groups/molecule (such as from about 3 to about 10 or from about 4 to about 8 free epoxide groups/molecule), and being a polymerization product of at least one epoxy-functional acrylate or methacrylate monomer, preferably copolymerized with at least one additional monomer. The acrylate polymer or copolymer suitably has a number-average molecular weight per epoxide group of about 150 to about 700, such as from 200 to 500 or from 200 to 400 g/mol. The acrylate polymer or copolymer suitably has a number-average molecular weight of from 1000 to 6000, such as from about 1500 to 5000 or from about 1800 to 3000 g/mol. Other approaches to introducing long-chain branching are described in U.S. Pat. Nos. 5,359,026 and 7,015,302, and in WO 06/002372A2.

In preferred embodiments, the PMLA lacks long-chain branches.

The number-average molecular weight of the PMLA may be, for example, in the range of 5000 to 200,000 g/mol, as measured by GPC against a polystyrene standard. Number-average molecular weights of about 30,000 to 130,000 g/mol are preferred.

The PMLA is in some embodiments characterized by having a relative viscosity of 1.1 to 6, 1.25 to 5, or 1.5 to 3.5, measured using a 1% wt/vol solution of the polylactide resin in chloroform against a chloroform standard on a capillary viscometer at 30° C.

The PMLA may be heterotactic, or partially syndiotactic and partially heterotactic. The average length of blocks of L-lactic units and of D-lactic units in the PMLA may be, for example, equal to at least 1.1, at least 1.2, at least 1.25, or at least 1.3 and, for example, up to 2, up to 1.75, up to 1.5, or up to 1.4. The average block length can be determined by proton NMR using methods to determine Pm as described by Coates et al., in *J. American Chemical Society* 2002, 124, 1316, and the following relationship:

Average block length=1+$P_m$/(1+(1-$P_m$))

In some embodiments, the PMLA has a glass transition temperature of 38° C. to 50° C.

The PMLA is characterized as being an amorphous PLA grade. By an "amorphous grade", it is meant the PMLA contains no more than 5 J/g of crystallites after being heated at 110° C. in air for one hour. The sample is previously heated to at least 220° C. to melt any crystallites and then quenched by rapidly cooling to room temperature (23±3° C.). The quenched sample is then heated at 110° C. for one hour and again quenched by cooling to room temperature. Crystallinity then is conveniently measured using differential scanning calorimetry (DSC) methods. The amount of such crystallinity is expressed herein in terms of J/g, i.e., the enthalpy of melting, in Joules, of the polylactide crystals in the sample, divided by the weight in grams of polylactide(s) in the sample. A convenient test protocol for making DSC measurements is to heat a 5-10 milligram sample from 25° C. to 225° C. at 20° C./minute under air, on a Mettler Toledo DSC 3+ calorimeter running STARe V.16 software, or equivalent apparatus.

The PMLA is produced by polymerizing meso-lactide by itself or by copolymerizing a meso-lactide and another lactide in random and/or block fashion. The polymerization can be conducted batch-wise, semi-continuously, or continuously.

A suitable polymerization temperature preferably is above the melting temperature of the monomer or monomer mixture, but below the temperature at which significant polymer degradation occurs. The temperature range may be, for example, as low as 60° C. or as much as 225° C.

Molecular weight and conversion are controlled by polymerization time and temperature, the equilibrium between free lactide and the polymer, and by the use of initiator compounds. In general, increasing quantities of initiator compounds on a molar basis will tend to decrease the molecular weight of the product polymer. Molecular weight control agents such as described in U.S. Pat. No. 6,277,951 can also be added to obtain the desired molecular weight.

It is preferred to perform the polymerization in the presence of a polymerization catalyst. Examples of these catalysts include various tin compounds such as $SnCl_2$, $SnBr_2$, $SnCl_4$, $SnBr_4$, SnO, tin (II) bis(2-ethyl hexanoate), butyltin tris(2-ethyl hexanoate), hydrated monobutyltin oxide, dibutyltin dilaurate, tetraphenyltin, and the like; PbO, zinc alkoxides, zinc stearate, compounds such as aluminum alkoxides, compounds such as antimony triacetate and antimony (2-ethyl hexanoate), compounds such as bismuth (2-ethyl hexanoate), calcium stearate, magnesium stearate, certain yttrium and rare earth compounds such as are described in U.S. Pat. No. 5,208,667 to McLain et al., chiral (R)-(SalBinap)-$AlOCH_3$ complexes as described in Macromol. Chem. Phys. 1996, 197, 2627-2637, single-site β-diimidate zinc alkoxide catalysts as described in *JACS* 1999, 121, 11583-11584, lithium t-butoxide aggregates as described in *Macromolecules* 1995, 28, 3937-3939 and *Polymer* 1999, 40, 5455-5458; aluminum and yttrium-based catalyst complexes as described in *JACS* 2002, 124, 1316-1326, dinuclear indium catalysts as described in *Macromolecules* 2016, 49, 909-919, and the like. Catalysts are used in catalytically effective amounts, which depend somewhat on the particular catalyst, but are usually in the range of 1 mole of catalyst per 3000 to 50,000 moles of monomers.

The selection of catalyst and polymerization temperature each can affect the stereochemistry of the PMLA. In general, the selection of a higher polymerization temperature, particularly 120° C. or greater and especially 150° C. or higher, has been found to lead to less stereospecificity in the PMLA, leading to an average block length of greater than 1 and less than 2. Similarly, tin-based catalysts also tend to favor lower stereospecificity. In some embodiments, the PMLA is polymerized with a tin catalyst at a temperature of at least 120° C., preferably at least 150° C., and up to 225° C., more preferably up to 190° C.

The resulting PMLA resin contains metal catalyst residues, which are preferably deactivated by contacting the PMLA resin with a deactivating agent.

The residence time under polymerization conditions are selected to produce a polymer of the desired molecular weight and/or desired conversion of monomers.

The PMLA may contain residual lactide. If present, lactide may constitute up to 20%, up to 15%, up to 10%, up to 5% or up to 2% of the weight of the PMLA.

Polylactide (b)

Polylactide (b) has a number-average molecular weight as measured by GPC against a polystyrene standard of at least 5000 g/mol. The number-average molecular weight may be, for example, up to 200,000 g/mol. As with the PMLA, number-average molecular weights of about 30,000 to 130,000 g/mol are preferred.

Polylactide (b) is in some embodiments characterized by having a relative viscosity of 1.1 to 6, such as 1.25 to 5, or 1.5 to 3.5, measured using a 1% wt/vol solution of the polylactide resin in chloroform against a chloroform standard on a capillary viscometer at 30° C.

Lactic units constitute at least 90% or at least 95% by weight of polylactide (b). As with the PMLA, the remaining weight of polylactide (b) if any may include residues of an initiator compound and/or repeating units produced by polymerizing one or more monomers different from lactide.

The lactic units in polylactide (b) consist of L-lactic units and D-lactic units in a ratio of ≥65:35 or ≤35:65. This ratio may be, for example, 75:25 to 100:0, 80:20 to 100:0, 85:15 to 100:0, 86:14 to 100:0, 25:75 to 0:100, 20:80 to 0:100, 15:85 to 0:100, or 14:86 to 0:100. It is preferred that the L-lactic units and D-lactic units are arranged randomly.

In some embodiments, the polylactide (b) is a semi-crystalline grade in which the ratio of L-lactic units to D-lactic units is 92:8 to 100:0 or 8:92 to 0:100.

In other embodiments, the polylactide (b) is an amorphous grade in which the ratio of L-lactic units to D-lactic units is 86:14 to 92:8 or 8:92 to 14:86.

Polylactide (b) is in some embodiments a homopolymer of L-lactide or a random copolymer of L-lactide with one or more of meso-lactide, D-lactide, and rac-lactide. In the latter case, the proportion of the various lactides is selected to provide a ratio of L-lactic units to D-lactic units of 65:35 to 99.9:0.1. This ratio in some embodiments is 75:25 to 99.9:0.1, 80:20 to 99.9:0.1, 86:14 to 99.9:0.1, 92:8 to 99.9:0.1 or 86:14 to 92:8.

Polylactide (b) is in some embodiments a homopolymer of D-lactide or a random copolymer of D-lactide with one or more of meso-lactide, L-lactide, and rac-lactide. In the latter case, the proportion of the various lactides is selected to provide a ratio of L-lactic units to D-lactic units of 35:65 to 0.1:99.9. This ratio in some embodiments is 25:75 to 0.1:99.9, 20:80 to 0.1:99.9, 14:86 to 0.1:99.9, 8:92 to 0.1:99.9 or 15:85 to 8:92.

Polylactide (b) preferably does not include both a polylactide in which the ratio of L-lactic units to D-lactic units is 65:35 or greater and another polylactide in which the ratio of L-lactic units to D-lactic units is 35:65 or lower.

Polylactide (b) in some embodiments has a glass transition temperature of 55° C. to 65° C. and a crystalline melting temperature (if semi-crystalline) of 95° C. to 195° C.

The other characteristics of polylactide (b), and the manner in which it is manufactured, are as described above with regard to the PMLA.

Polylactide Resin Composition

The polylactide resin composition comprises a mixture of polylactide resins. The polylactide resins are melt- or solution-blended, rather than being a physical mixture of separate particles of the constituent polylactides. The PMLA constitutes 50 to 95 weight percent of the total weight of all polylactides. In some embodiments, the PMLA constitutes at least 60%, at least 65%, or at least 70% of the total weight of all polylactides. In some embodiments the PMLA constitutes up to 90%, up to 85%, or up to 80% of all polylactides.

Polylactide (b) constitutes 5 to 50 weight percent of the total weight of all polylactides. In some embodiments, polylactide (b) constitutes at least 10%, at least 15%, or at least 20% of the total weight of all polylactides. In some embodiments polylactide (b) constitutes up to 40%, up to 35%, or up to 30% of all polylactides.

Other polylactides may be present, but if present preferably constitute no more than 10%, no more than 5%, or no more than 2% of the total weight of the constituent polylactides and may be absent.

The hydrolysis rate and rate of mass loss of the polylactide resin composition varies with the ratio of the PMLA and polylactide (b). A greater proportion of PMLA tends to lead to faster rates of hydrolysis and mass loss, and vice versa. Accordingly, this ratio is a variable by virtue of which the hydrolysis and mass loss rates of the composition can be adjusted upwardly or downwardly. A greater proportion of PMLA also tends to lead to lower residuals.

The rates of hydrolysis and mass loss can be further accelerated by including an organic carboxylic acid having 6 to 30 carbon atoms, especially 8 to 22 carbon atoms in the polylactide resin composition, and/or an anhydride of one or more such acids. The organic carboxylic acid may have one, two, or a greater number of carboxyl groups. Among the suitable organic acids include straight-chain alkanoic acids such as n-hexanoic acid, n-octanoic acid, n-decanoic acid, lauric acid, myristic acid, stearic acid, and the like; branched alkanoic acids such as 2-, 3-, and/or 4-methyl valeric acid, 2-hexyl decanoic acid, 2-butyl octanoic acid, 2-ethyl hexanoic acid, 2-ethyl octanoic acid, 2-ethyl decanoic acid, and 2-ethyl butyric acid; mono- and/or polyunsaturated alkanoic acids such 2 hexenoic acid, undecylenoic acid, petroselenic acid, oleic acid, erucic acid, ricinoleic acid, linoleic acid, linolenic acid, and the like; aromatic-substituted acids such as benzoic acid, hydrocinnamic acid, 4-ispropyl benzoic acid, and ibuprofen; and other aliphatic carboxylic acids such as monobutrin. In addition, any of the foregoing that are substituted with one or more halogen and/or hydroxyl groups are suitable. The corresponding anhydrides of any one or more of the foregoing are also useful. Preferred organic acids include linear or branched alkanoic acids having 8 to 18 carbon atoms. Lauric acid is especially preferred.

The amount of organic carboxylic acid, when present, may be from 0.1 to 20% of the combined weight of the organic carboxylic acid plus all polylactides in the polylactide resin composition. Rates of hydrolysis and mass loss increase with increasing amounts of the acid. Therefore, the amount of the acid represents another variable by which the hydrolysis and mass loss rates can be adjusted upwardly or downwardly. A preferred amount of organic acid, when present, is at least 1% or at least 2% and up to 12%, up to 10%, or up to 8%, on the foregoing basis.

The polylactide resin composition may contain other materials as may be useful for the particular end-use application in which it will be used. These may include, for example, polymers other than polylactides, i.e., a non-polylactide polymer. Such a polymer may be hydrolysable and/or biodegradable by itself. In such a case, the polymer may function at least in part to further modify the hydrolytic behavior or the polylactide composition. An example of such a hydrolysable polymer is a polyglycolic acid, i.e., a polymer or copolymer of glycolide or glycolic acid, which when present may accelerate the hydrolysis and mass loss rate of the polylactide resin composition.

A non-polylactide polymer, if present, may constitute, for example 0.1 to 50%, 1 to 25% or 1 to 10%, of the combined weight of the non-polylactide polymer and the polylactides.

Other optional materials that may be present in the polylactide resin composition include crystallization nucleators such as finely divided solids; colorants; impact modifiers; internal and/or external lubricants, anti-block, and other extrusion processing aids; and the like. The polylactide resin composition of the invention can be compounded with various types of reinforcing fillers or fibers to produce reinforced composites.

The polylactide resin composition may be expanded to reduce its density below the bulk density of the polylactides. This may be done by, for example, via various extrusion processes in which a melt of the polylactides is combined with a blowing agent under pressure. The melt is then transferred to a region of lower pressure such that the blowing agent volatilizes as the polylactides cool, thereby expanding the composition. Other foaming methods, such as various frothing and bead foaming methods, can be used. A solid blend polylactide resin composition with a fugitive material compound can be prepared, followed by removal of the fugitive material to produce voids in the composition. The reduced density may be at least 0.1 $g/cm^3$, at least 0.25 $g/cm^3$, or at least 0.5 $g/cm^3$ and, for example, up to 1.2 $g/cm^3$, up to 1.1 $g/cm^3$, up to 1 $g/cm^3$ or up to 0.9 $g/cm^3$. Reducing density in some cases provides desirable buoyancy characteristics.

The polylactide resin composition is useful in the same manner as conventional polylactide compositions in which little or low crystallinity is needed. It can be melt-processed via processes such as extrusion to pellets, extrusion foaming, blow molding, injection stretch blow molding, thermoforming, injection molding, melt spinning, lamination, and the like. It can be formed into various dispersions for coating applications. Applications of particular interest are those in which the polylactide resin composition is desired to hydrolyze, either during use or after use (such as upon disposal). The rapid rate of hydrolysis and mass loss exhibited by the polylactide resin composition of the invention is an important advantage of this invention, particularly at low to moderately elevated temperatures such as 37° C. to 66° C.

The polylactide resin composition can be hydrolyzed by exposure to liquid water (or other aqueous fluid) and/or steam. During hydrolysis, the polylactide resin composition may be, for example, immersed in or otherwise in contact with liquid water (or other aqueous fluid) or contacted with steam. The temperature affects hydrolysis and mass loss rates, with higher temperatures leading to higher rates. The temperature may be, for example, above 0° C. to 100° C., or even higher if superatmospheric pressures are employed to prevent the water from boiling, or when the hydrolysis is affected by the presence of steam. In some embodiments, such as composting applications, the temperature may be, for example, 0° C. to 50° C. In other embodiments, hydrolysis is performed in the presence of liquid water at a temperature of 40° C. to 66° C., 48° C. to 66° C., or 48° C. to 60° C. These latter temperatures are typical of certain oil and/or gas production wells in which the polylactide resin composition of the invention is useful as a diverter.

The polylactide composition may be provided in the form of small particulates such as pellets, beads, powders, and fibers or as thin articles, as mass transport of the water to the surface of and into small particulates is relatively rapid. Such particulates may have, for example a cross-sectional area of no greater than 1 $cm^2$, no greater than 0.1 $cm^2$ or no greater 1 $mm^2$. Thin articles may have a thickness (smallest dimension) of no greater than 2.54 mm or no greater than 1 mm. For composting applications, larger articles may be ground, shredded, powdered or otherwise comminuted to decrease the thickness or cross-sectional area to facilitate faster hydrolysis and mass loss.

When in particulate form, the polylactide resin composition of the invention, when hydrolyzed under constant temperature conditions, tends to exhibit an induction period in which hydrolysis takes place but little or no mass loss is seen because the hydrolysis products have not yet achieved the low molecular weights, <1000 g/mol, required for solubility in a hydrolysis medium. The observation of an induction time is consistent with the bulk hydrolysis mechanism for PLA, where the rate of water diffusion exceeds the rate of ester hydrolysis.

This induction period may require hours or days, depending on factors such as temperature and composition of the polylactide resin (including the ratio of PMLA to polylactide (b) and amount of organic acid, if any). The particles typically retain their particulate nature during this induction period.

This induction period is followed by a period of relatively rapid mass loss as hydrolysis proceeds to the point at which low-molecular-weight hydrolysis products form and dissolve. The particles reduce in size as mass is lost during this period. In some cases, the particles may agglomerate slightly, particularly during earlier stages of the mass loss period. The mass loss during this period may constitute, for example, 50% to 95% of the total starting mass of the polylactide resin composition. In certain embodiments, at least 60%, at least 70%, at least 75%, at least 80%, or at least 85% of the starting mass is lost during this stage.

The D-lactic acid content of the residual polylactide resins in the polylactide resin composition has been found to change as mass is lost. In general, the proportion of the less predominant lactic unit enantiomer tends to decrease as hydrolysis proceeds and mass is lost. For example, when polylactide (b) contains predominantly L-lactic units, the polylactide resin composition at the start of hydrolysis also will contain a small predominance of L-lactic units over D-lactic units. As mass is lost, the L-lactic units in the remaining material tend to become more and more predominant. Although the invention is not limited to any theory, this is believed to be at least partly attributable to the faster hydrolysis and loss of mass of the PMLA component, compared to polylactide (b).

It has also been found, quite surprisingly, that the remaining particles of the polylactide resin composition tend to develop significant amounts of crystallinity as mass is lost. Remarkably, the crystallinity that develops can exceed the extent of crystallinity that can be attained by crystallizing polylactide (b) by itself. In some embodiments, polylactide (b) is incapable or barely capable of crystallizing by itself, yet the polylactide composition of the invention, during the mass loss stage, has been found to form very significant amounts of crystallinity, such as 20 J/g or more or even 30 J/g or more of crystallites. Without limiting the invention to any theory, it is believed the crystallinity forms due to the reduction of molecular weight of the remaining polylactide resin, forming oligomers that can crystallize readily even when polylactide (b), before hydrolysis, crystallizes sluggishly or not at all.

As the particles become more crystalline, any small amount of agglomeration that is seen earlier tends to be lost, and the particles tend to become free-flowing and non-agglomerated again.

After 50% to 95% of their initial mass is lost, the mass of the polylactide resin composition tends to reach a plateau, with further mass loss occurring very slowly. This mass loss plateau may be attributable to the highly crystalline nature of the remaining composition, where hydrolysis proceeds very slowly. The crystallinity of the remaining mass of polylactide resin composition at this time may be at least 40 J/g, at least 45 J/g, or even 50 J/g or more. An advantage of the invention is that this plateau often is not reached until at least 75%, at least 80%, at least 85%, or even at least 90% of the mass of the starting polylactide resin composition has been lost. Residuals, correspondingly, are often 25% or less, 20% or less, 15% or less, or even 10% or less of the starting weight of the polylactide resin composition. Given time and sufficient concentration of water, these crystallites will further hydrolyze and eventually dissolve in a hydrolysis medium.

The mass loss behavior of two polylactide resin compositions is shown graphically in FIGS. 1 and 2, as discussed more fully in the following examples section.

The polylactide resin composition of the invention typically is resistant to dry blocking, i.e., blocking when heated in air in the absence of liquid water to temperatures of about 44° C. or more, as determined using the test method described in the examples that follow. The tendency to dry block can be reduced by applying a lubricant such as ethylene bis(stearamide), various fatty acid esters, salts and amides, various silicone lubricants, and the like to the surfaces of the polylactide resin composition particles. A convenient amount of such a lubricant is, for example, 100 to 10,000 parts by weight of lubricant per million parts by weight of the particles ("ppm"). Applying such a lubricant can increase the temperature at which the particles resist dry blocking.

The polylactide resin composition of the invention is particularly useful as a diverter in well treatment operations. In such operations, a particulate polylactide resin composition is introduced into the well together with a treatment fluid. The particulates may have varying dimensions. The treatment fluid is typically aqueous. The treatment fluid will generally take the path of least resistance as it flows within the formation. The polylactide resin composition is carried with the treatment fluid, and bridges a fracture, thereby providing a physical barrier to the further flow of the treatment fluid through those sections in which the diverter has deposited. Further flow of the treatment fluid is therefore forced into otherwise less-accessible regions of the formation. The primary reason for using degradable diverters is to increase the stimulated reservoir volume of a given formation.

The diverter should remain in place only temporarily so as not to block the recovery of hydrocarbons through those sections of the formation occupied by the diverter. Accordingly, the diverter is subjected to hydrolysis conditions while emplaced in the formation by exposure to water, and preferably an elevated temperature. The elevated temperature may be, for example, 40° to 66° C., 48° to 66° C., or 48° to 60° C. The hydrolysis conditions may be maintained, for example, until at least 50%, at least 60%, at least 70%, at least 75%, at least 80%, or at least 85% of the starting mass of the polylactide resin composition has been lost due to hydrolysis. This may require, for example at least 1, at least 2, at least 5, at least 8, at least 10, or at least 14 days in some embodiments, depending on factors such as the particular polylactide resin composition (including the ratio of PMLA and polylactide (b), the choice of polylactide (b), the presence and amount of hydrolysis accelerator, for example), and the hydrolysis conditions.

In some embodiments, a diverter comprising a particulate polylactide resin composition of the invention exhibits a $t_{1/2}$ (time to achieve 50% mass loss) of no more than 20 days, no more than 15 days, no more than 12 days, or no more than 10 days, when hydrolyzed by submersing the particles in deionized water in a closed vial at a temperature of 54.4° C. (130° F.). The $t_{1/2}$ preferably is at least 1, at least 2, at least 5, or at least 8 days according to this testing protocol.

The following examples illustrate the invention but are not intended to limit it in any way. All parts and percentages are by weight unless otherwise indicated.

PMLA 1 is a linear copolymer made by polymerizing a mixture of about 90% meso-lactide and 10% L-lactide in the presence of a tin catalyst at 160-180° C. Lactic units constitute over 98% of the total weight of PMLA 1. 45% of the lactic units are D-lactic units and 55% are L-lactic units. PMLA 1 has a number-average molecular weight of 68,000 g/mol and a weight-average molecular weight of 131,000 g/mol as measured by GPC against polystyrene standards. PMLA 1 has an average length of blocks of L-lactic units and of D-lactic units between 1.1 and 1.75.

PMLA 2 is a linear copolymer similar to PMLA 1, except the number-average molecular weight is 31,000 g/mol and the weight-average molecular weight is 75,000 g/mol as measured by GPC against polystyrene standards. PMLA 1 has an average length of blocks of L-lactic units and of D-lactic units between 1.1 and 1.75.

Polylactide (b-1) is a linear, random copolymer of about 76% L-lactide, about 1.5% D-lactide, and about 22.5% meso-lactide. Lactic units constitute over 98% of the total weight of polylactide (b-1). About 12% of the lactic units are D-lactic units and about 88% are L-lactic units. Polylactide (b-1) has a relative viscosity of 2.5. Relative viscosity is the ratio of the viscosity of a 1% wt/vol solution of the polylactide resin in chloroform to that of a chloroform standard, as measured using a capillary viscometer at 30° C. Polylactide (b-1) is an amorphous grade that forms little or no crystallites when heated in air at 110° C. even for several hours.

Polylactide (b-2) is a linear, random copolymer of L-lactide, meso-lactide and a small amount of D-lactide. Lactic units constitute over 98% of the total weight of polylactide (b-2). 1.4% of the lactic units are D-lactic units and 98.6% are L-lactic units. Polylactide (b-2) has a relative viscosity of 2.5. Polylactide (b-2) is a semi-crystalline grade that crystallizes easily when heated in air at 110° C. for several hours.

Mass loss experiments are performed according to the following protocol. 2 grams of the sample and 20 mL of deionized water are placed into each of multiple vials. The vials are sealed. The vials are then placed into a controlled temperature environment. The vials are removed one-by-one periodically over time. Blocking/agglomeration is evaluated by inverting the removed vial and observing the remaining solids. If the solids do not flow freely, then the side of the vial is tapped lightly to attempt to break up any agglomerated masses. The liquid phase is separated from the remaining solids via filtration, and the solids are then dried at least overnight at 40° C. under vacuum and then weighed to determine mass loss. The time at which 50% of the starting mass is lost is reported as $t_{1/2}$. Testing is continued until the remaining mass reaches a plateau with little or no further mass loss. The mass of the residuals (remaining mass upon reaching the plateau) is measured.

EXAMPLES 1-2 AND COMPARATIVE SAMPLES A-C

Blends of Polylactide (b-1) and PMLA 1 with lauric acid are prepared by melt-blending the components indicated in Table 1 in a twin-screw extruder, extruding strands of the resulting blends and pelletized underwater into 2.5-mm to 4.0-mm pellets. In each case the ratio of Polylactide (b-1) to PMLA 1 is 30/70 by weight.

TABLE 1

| Component | Parts By Weight | |
|---|---|---|
| | Ex. 1 | Ex. 2 |
| Polylactide (b-1) | 29.4 | 27.6 |
| PMLA 1 | 68.6 | 64.4 |
| Lauric Acid | 2 | 8 |

Similarly, melt blends of Polylactide (b-1) and lauric acid are prepared at ratios of 98:2 and 92:8 and formed into pellets. Blends of Polylactide (b-1) with 0%, 2%, and 8% lauric acid are designated as Comparative Samples A, B, and C, respectively.

Mass loss evaluations are performed on Example 1 at a temperature of 50° C. (122° F.). In addition to mass loss measurements, the remaining solids taken after various times are evaluated for crystallinity and crystalline melting temperature by differential scanning calorimetry, lauric acid content by GC/FID, and % D-lactic enantiomer using a GC/FID method capable of separating the enantiomers of lactic acid derivatives. Results are indicated graphically in FIG. 1.

Figure 1:
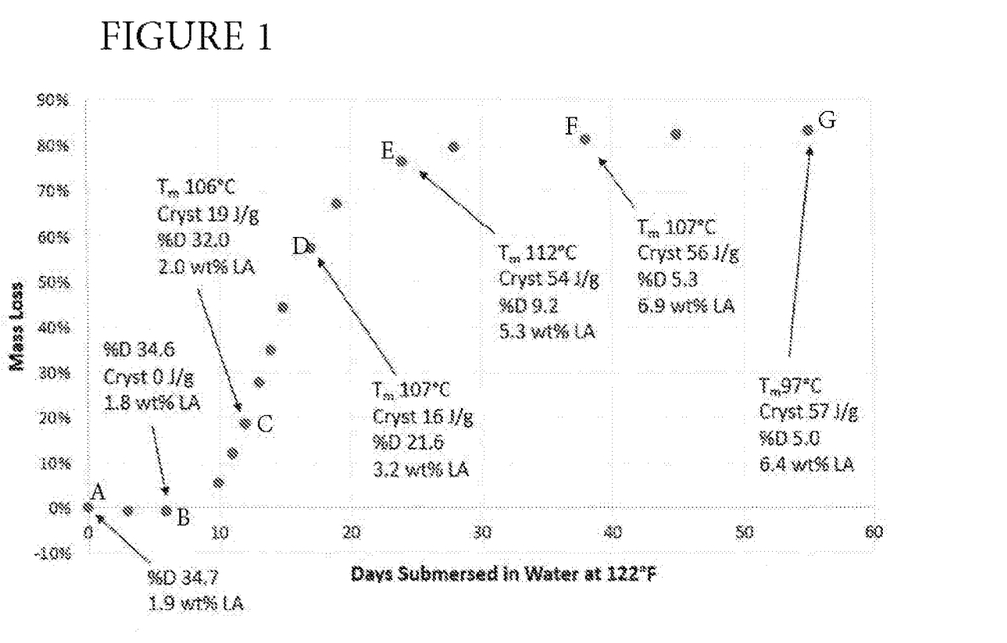
FIG. 1 is a graph illustrating the mass loss characteristics of the polylactide resin composition of Example 1.

As shown in FIG. 1, the starting sample contains 34.7% D-lactic enantiomer (based on all lactic acid units) (Point A). It contains no crystallinity and therefore has no measurable melting temperature.

No weight loss is seen before 6 days, and no significant change in crystallinity or enantiomer ratio is detected at that time (Point B). Mass loss is seen starting at about 7 days. A period of relatively rapid mass loss ensues, during which about 80% of the starting mass is lost over a period of about 28 days; $t_{1/2}$ is 15-16 days. As shown at Points C, D, and E, the proportion of D-lactic enantiomer decreases steadily over this time, falling to only 9.2% after 24 days (Point D). At that time, the remaining solids have become highly crystalline, exhibiting a melting temperature of 112° C. The lauric acid concentration also increases during this period.

These results suggest that the PMLA is being preferentially hydrolyzed and lost from the samples during this period of relatively rapid mass loss. The large increase in crystallinity, particularly between points D and E, suggests that Polylactide (b-1) is hydrolyzing as well, albeit more slowly. It is noted that the crystallinity that develops even as early as Point C (12 days) is significantly greater than can be developed in Polylactide (b-1) by itself. It is believed that as Polylactide (b-1) hydrolyzes, it forms oligomers that are very rich in L-lactic enantiomer and other oligomers which have significant proportions of both the L- and D-enantiomers. The formed oligomers are believed to be able to crystallize easily, accounting for the development of the large amount of crystallinity of the samples as hydrolysis proceeds. It is also believed that the oligomers which are less enantiomerically pure are more likely to undergo further hydrolysis and dissolve into the aqueous phase, thereby contributing to mass loss.

Further mass loss is slow after 28 days. Mass loss increases from 80% to only about 83% over the following 28 days, as indicated by Points F and G. The proportion of D-lactic enantiomer in the residuals continues to fall while crystallinity and lauric acid contents remains roughly constant. The residuals for Example 1 are therefore approximately 20%.

Example 2 and Comparative Samples A, B, and C are evaluated for mass loss at 50° C. in the same manner. $T_{1/2}$ and residuals (at specified times) are as indicated in Table 2.

TABLE 2

| Sample | $t_{1/2}$ (days) | Residuals, % (days) |
|---|---|---|
| Ex. 2 | 13 | 20% (31 days) |
| | | 11% (52 days) |
| Comp. A | 50 | 70% (40 days) |
| Comp. B | 42 | Not determined |
| Comp. C | 42 | Not determined |

The results in Table 2 demonstrate a greatly increased rate of hydrolysis for the Examples of the invention, compared to Comparative Samples A-C, as well as greatly reduced residuals.

Mass loss is determined for Example 2 and Comparative Samples A, B, and C at 54.4° C., and for Example 2 and Comparative Samples B and C at 60° C. Results are as indicated in Table 3.

TABLE 3

| Sample | Temperature, ° C. | $t_{1/2}$ (days) | Residuals, % (days) |
|---|---|---|---|
| Ex. 2 | 54.4 | 8 | 14 (31) |
|  |  |  | 9 (52) |
|  | 60 | 7 | 10 (31) |
|  |  |  | 5 (52) |
| Comp. A | 54.4 | 32 | 43 (46) |
|  | 60 | 20 | 40 (30) |
| Comp. B | 54.4 | 25 | Not determined |
| Comp. C | 54.4 | 25 | Not determined |

Similar results are seen at the higher hydrolysis temperatures. The polylactide resin composition of the invention hydrolyzes much more rapidly and leaves far fewer residuals.

EXAMPLES 3-6

Melt blends of PMLA-1, Polylactide (b-1) and lauric acid are made in the manner described in the foregoing example, from the ingredients indicated in Table 4. Mass loss is evaluated at 54.4° C.; $t_{1/2}$ and residuals are as reported in Table 4.

TABLE 4

| | Parts by Weight | | | |
|---|---|---|---|---|
| Component | Ex. 3 | Ex. 4 | Ex. 5 | Ex. 6 |
| Polylactide (b-1) | 20 | 19.6 | 19.2 | 18.4 |
| PMLA 1 | 80 | 78.4 | 76.8 | 75.6 |
| Lauric Acid | 0 | 2 | 4 | 8 |
| $t_{1/2}$ (54.4° C.) | 14 | 10-11 | 10-11 | 10-11 |
| Residuals, % (days) | 16 (18 days) | 12 (18 days) | 12 (18 days) | 16 (18 days) |
|  | 10 (35 days) | 19 (35 days) | 6 (35 days) | 9 (35 days) |

Each of Examples 3-6 exhibits a rapid rate of mass loss and low residuals.

EXAMPLES 7 and 8

Melt blends of PMLA-2, Polylactide (b-1), and lauric acid are made in the manner described in the foregoing example, from the ingredients indicated in Table 5. Mass loss is evaluated at 50° C.; $t_{1/2}$ and residuals are as reported in Table 5.

TABLE 5

| Component | Example 7 | Example 8 |
|---|---|---|
| Polylactide (b-1) | 30 | 29.4 |
| PMLA2 | 70 | 68.6 |
| Lauric Acid | 0 | 2 |
| $t_{1/2}$ (50° C.) | 18 | 15 |
| Residuals, % (days) | 21 (28 days) | 18 (28 days) |
|  | 17 (53 days) | 14 (53 days) |

EXAMPLES 9-13

Polylactide resin compositions are made by melt-blending the components indicated in Table 6, using the method described before. Mass loss is determined for each of these Examples, using the procedure previously described at a 54.4° C. hydrolysis temperature; $t_{1/2}$ in each case is as reported in Table 6.

TABLE 6

| Component | Ex. 9 | Ex. 10 | Ex. 11 | Ex. 12 | Ex. 13 |
|---|---|---|---|---|---|
| Polylactide (b-2) | 10 | 20 | 30 | 29.4 | 27.6 |
| PMLA 1 | 90 | 80 | 70 | 68.6 | 64.4 |
| Lauric Acid | 0 | 0 | 0 | 2 | 8 |
| $t_{1/2}$ (days) | 13 | 14 | 15 | 11-12 | 11 |

Very fast rates of mass loss are again seen, despite the fact the polylactide (b-2) is a semi-crystalline grade that would be expected to hydrolyze slowly.

For Example 13, the remaining solids taken after various times are evaluated for crystallinity and crystalline melting temperature as described with regard to Example 1. Results are indicated graphically in FIG. 2.

Figure 2:
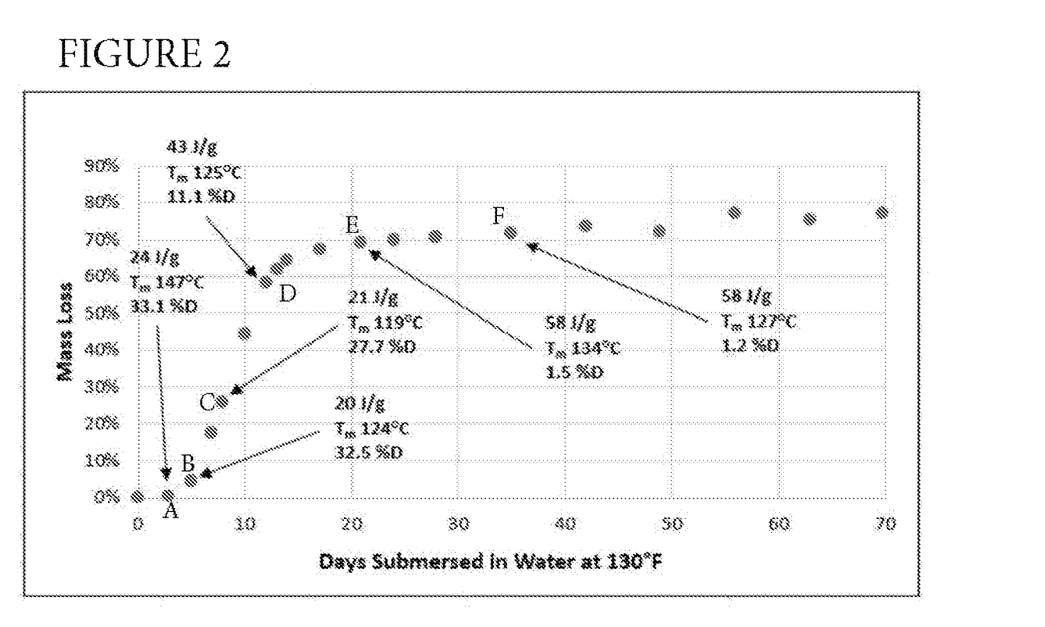
FIG. 2 is a graph illustrating the mass loss characteristics of the polylactide resin composition of Example 13.

As shown in FIG. 2, the sample after 3 days hydrolysis contains about 33% D-lactic enantiomer (based on all lactic acid units) (Point A). No weight loss is seen. The sample contains 24.7 J/g crystallinity due to the presence of a semi-crystalline polylactide grade (Polylactide (b-2)). The melting temperature is 147° C. In contrast to Example 1, this sample is seen to develop crystallinity early in the hydrolysis process.

Mass loss is seen starting at about 4 days. A period of relatively rapid mass loss ensues, during which about 70% of the starting mass is lost over a period of about 22-24 days, for which $t_{1/2}$ is about 11 days. As shown at Points B, C, D, and E, the proportion of D-lactic enantiomer decreases steadily over this time, falling to only 1.5% after 22 days (Point E). Crystallinity increase to 58 J/g after 22 days (Point E).

Further mass loss after 22 days is slow. Mass loss increases from 70% to only about 75-78% over the following 48 days. The proportion of D-lactic enantiomer in the residuals continues to fall, as indicated by Points F and G, while crystallinity remains roughly constant. The residuals for Example 2 are therefore approximately 22-25%.

Examples 11-13 are observed for blocking behavior during the course of the mass loss experiment. Example 11 remains as a free-flowing particulate throughout the course of the mass loss experiment. Examples 12 and 13 form light aggregates that break apart by tapping the side of the vial or with light stirring.

Examples 12 and 13 are evaluated for dry blocking. A small amount of pellets in each case are placed in 50 mL polypropylene centrifuge tubes. A metal cylinder is added to the top of pellets in each tube to simulate a head pressure of about 1 psig (6.89 kPa). The tube assemblies, as defined above, are heated in an oven for 24 hours at various temperatures, then examined for pellet flow behavior after the metal cylinder is removed and pellets have cooled to room temperature. If pellets are not observed to block, the tube assemblies are placed back in oven for an additional 24 hours where the temperature is increased in 2° C. increments until pellet blocking is observed.

Example 12 remains a free-flowing particulate when tested in this manner at 35° C. When tested at 40° C. it forms light agglomerates that break apart easily when the outside of the vial is tapped. At 42° C., the particles form agglomerates that do not break apart easily. When 1000 ppm of ethylene bis(stearamide) (EBS) is applied to the surface of the particles, they remain free-flowing to 44° C. and form only light, easily broken agglomerates at temperatures up to 50° C.

Example 13 when untreated with EBS performs similarly to Example 12. When 1000 ppm of EBS is applied to the surface of the particles, they remain free-flowing to 44° C. and form only light, easily broken agglomerates at 46° C.

What is claimed is:

1. A polylactide resin composition comprising a melt- or solution-blend of
    a) 70 to 95 weight percent, based on the weight of all polylactides in the composition, of at least one polymer or copolymer of meso-lactide having a number-average molecular weight as measured by gel permeation chromatography against a polystyrene standard of at least 5000 g/mol, wherein the polymer or copolymer of meso-lactide contains at least 90% by weight lactic units, at least 80% of the lactic units are formed by polymerizing meso-lactide and has an average length of blocks of L-lactic units and of D-lactic units equal to at least 1.1 and up to 2.0,
    b) 5 to 30 weight percent, based on the weight of all polylactides in the composition, of at least one polylactide having a number-average molecular weight as measured by gel permeation chromatography against a polystyrene standard of at least 5000 g/mol and at least 95% by weight lactic units, and wherein the lactic units are L-lactic units and D-lactic units in a ratio of 86:14 to 92:8 or 8:92 to 14:86, and
    c) 2-12% by weight of a linear or branched alkanoic acid having 8 to 18 carbon atoms based on the combined weight of the linear or branched alkanoic acid and all polylactides in the polylactide resin composition.

2. The polylactide resin composition of claim 1 wherein component a) has a glass transition temperature of 38° to 50° C.

3. The polylactide resin composition of claim 2 wherein component a) has an average length of blocks of L-lactic units and of D-lactic units equal to at least 1.1 and up to 1.75.

4. The polylactide resin composition of claim 1 which further comprises a homopolymer or copolymer of glycolide or glycolic acid.

5. The polylactide resin composition of claim 4 which contains 0.1 to 50% by weight of the homopolymer or copolymer of glycolide or glycolic acid, based on the combined weight of the homopolymer or copolymer of glycolide or glycolic acid and all polylactides in the polylactide resin composition.

6. A method for treating a subterranean formation comprising
    a) introducing a treatment fluid containing a liquid phase and particles of the polylactide composition of claim 1 into the subterranean formation, such that a mass of the particles is deposited in the subterranean formation, and then
    b) hydrolyzing the deposited particles in the subterranean formation by exposing the deposited particles to an aqueous medium and an elevated temperature such that the deposited particles lose at least 50% of their starting mass due to hydrolysis.

* * * * *